United States Patent [19]

Burgdorf

[11] Patent Number: 4,580,847
[45] Date of Patent: Apr. 8, 1986

[54] AUXILIARY-ENERGY-OPERABLE HYDRAULIC BRAKE SYSTEM FOR AUTOMOBILE VEHICLES

[75] Inventor: Jochen Burgdorf, Offenbach-Rumpenheim, Fed. Rep. of Germany

[73] Assignee: ITT Industries, Inc., New York, N.Y.

[21] Appl. No.: 544,502

[22] Filed: Oct. 24, 1983

[30] Foreign Application Priority Data

Nov. 11, 1982 [DE] Fed. Rep. of Germany ....... 3241662

[51] Int. Cl.[4] .................. B60T 8/00; B60T 13/14; B60T 13/68
[52] U.S. Cl. ................................... 303/100; 60/545; 303/114; 303/119
[58] Field of Search ................. 303/114, 119, 113, 13, 303/117, 61–63, 68–69, 15, 3, 100, 10–12; 188/181, 355–360; 60/582, 545, 547.1, 548, 543

[56] References Cited

U.S. PATENT DOCUMENTS

| 4,346,942 | 8/1982 | Leiber ............................ 303/114 X |
| 4,346,943 | 8/1982 | Leiber ............................ 303/114 X |
| 4,405,183 | 9/1983 | Resch ............................. 303/114 X |
| 4,428,623 | 1/1984 | Bertling et al. ...................... 303/114 |
| 4,482,192 | 11/1984 | Leiber ................................ 303/100 |
| 4,492,413 | 1/1985 | Belart et al. .................... 303/114 X |

Primary Examiner—Douglas C. Butler
Attorney, Agent, or Firm—James B. Raden; William J. Michals

[57] ABSTRACT

An auxiliary-energy-operable hydraulic brake system for automotive vehicles, in which a valve device connected to a pressure medium source and to an unpressurized reservoir and controlling an actuating pressure is operable by an actuating element which, irrespective of its direction of actuation, may be pressurized by a reaction force depending on the actuating pressure. The valve device is operable electromagnetically and controllable by an electric switching device connected with the actuating element.

17 Claims, 4 Drawing Figures

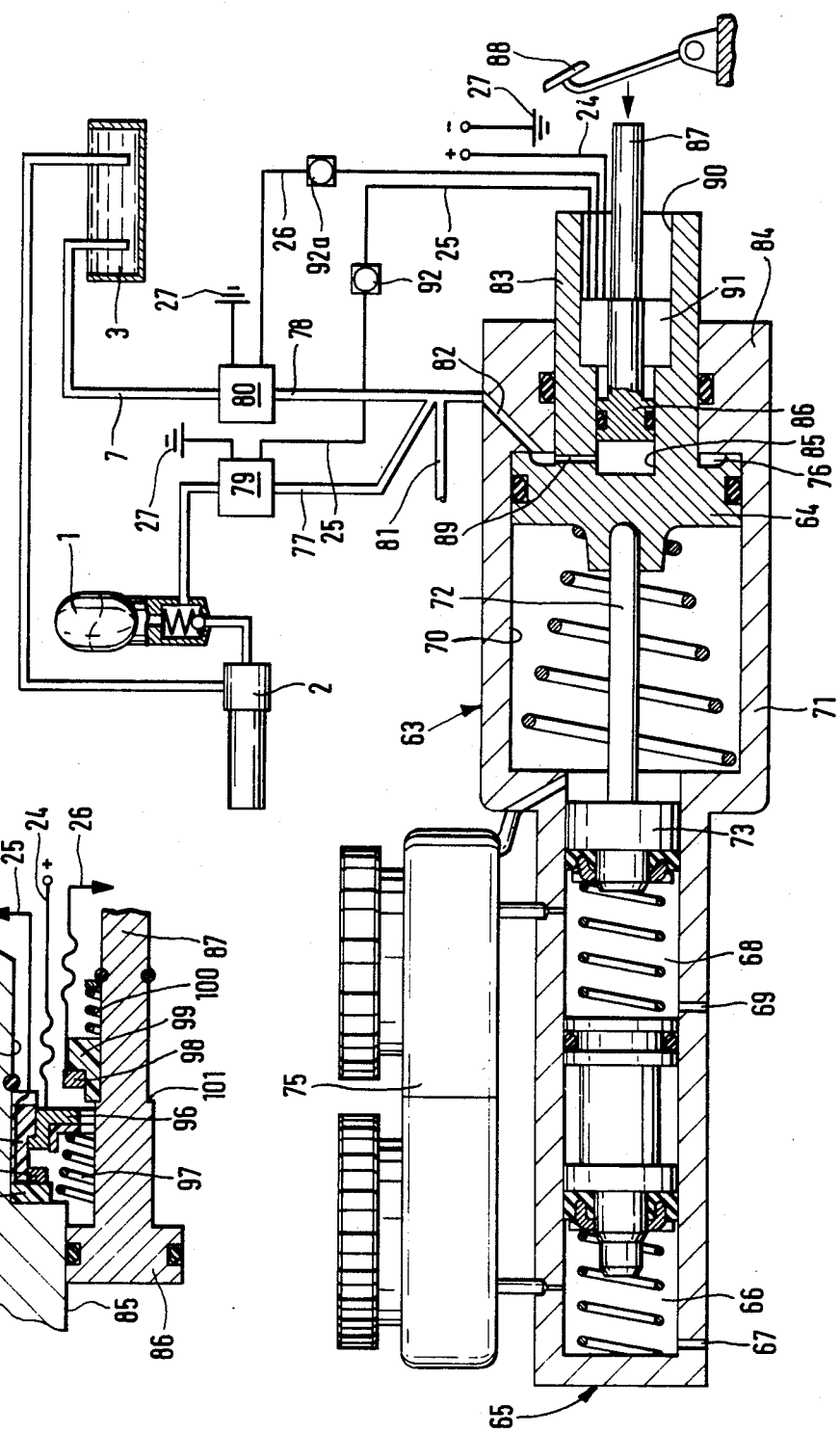

AUXILIARY-ENERGY-OPERABLE HYDRAULIC BRAKE SYSTEM FOR AUTOMOBILE VEHICLES

BACKGROUND OF THE INVENTION

This invention relates to an auxiliary-energy-operable hydraulic brake system for automotive vehicles, in which a valve device connected to a pressure medium source and to an unpressurized reservoir and controlling an actuating pressure is operable by an actuating element which, contrary to its direction of actuation, may be pressurized by the actuating pressure or by a force proportional to the actuating pressure.

Auxiliary-energy-type brake systems of the kind referred to are used for generating the required braking performance in heavier vehicles with the aid of relatively small actuating forces. In such cases, a sensitive control of the auxiliary force is required in order to enable an optimal adaptation of the braking action to the respective road and driving conditions.

In a known brake system of the type referred to above (German Printed Patent Application=DE-AS No. 2,602,050) a control slide is provided for the control of the auxiliary force. Said control slide is supported in an axial bore of a booster piston and axially displaceable by means of an actuating device. Depending on the relative position of the control slide, in this system, an axial bore in the control slide and passages arranged in the booster piston and in the control slide permit a working chamber confined by the control-slide-side front face of the booster piston to communicate with either a pressure line connected to an accumulator or with a return line. A relatively wide covering of the passage by the wall surface of the control slide is required in order to be able to close the passage connected to the accumulator in a sufficiently sealed manner in the rest position of the control slide. Further, the control slide has gaskets on both sides of the the passage which serve to contribute to a better sealing of the control slide. The relatively large actuating travel of the control slide and the friction of the gaskets are detrimental to sensitive pressure control for the actuation of the booster piston in particular in case of a low pressure level.

Another control unit for such an auxiliary-energy-operable master cylinder of a vehicular hydraulic brake system (German Patent Specification=DE-PS No. 2,343,882) has a seat valve arranged between the control slide and the accumulator in order to achieve an improved sealing. Upon any actuation of the brake, said seat valve will be opened by a tappet contrary to the accumulator pressure, said tappet being moved by an inclined ramp of the actuating element. In this known control device, the seat valve ensures a good sealing of the pressure port in the rest position. However, the fact of the seat valve's being pushed open against the accumulator pressure leads to an unfavourable responding behaviour of the control unit.

It is thus an object of this invention to reduce the responding force and the actuating travel and to enable a particularly sensitive dosage of the actuating pressure in a hydraulic brake system of the type referred to above.

SUMMARY OF THE INVENTION

According to this invention this object is solved in that the actuation of the valve device is performed by a solenoid whose excitation is controlled by an electric switching device connected with the actuating element. In the inventive brake system, only the small forces and distances of the electric switching device must be overcome in order to initiate a braking action and to actuate the valve device. Said forces and distances are many times smaller than the forces and distances for the actuation of a control slide or of a closure member of a hydraulic valve device. The invention further, without any disadvantage, permits the use of a valve device with which, in the rest position, it will be guaranteed that the port connected with the pressure medium source will be sealed completely as the relatively high opening and displacing forces of such valve devices may be generated by the solenoid without any difficulties. Further, the invention provides the possibility of additionally influencing the braking action by automatic control devices since the solenoid may also be excited by automatic switching devices, e.g., in order to effect an emergency braking.

In an especially simple design of the invention, the switching device comprises two switches which in their basic positions are open and which may be closed one after the other by the actuating element in a travel-responsive manner. The switch to close first upon actuation will control a sealing of the reservoir port of the valve device. The second switch will control an opening of the valve device's pressure port leading to the pressure medium source.

A combination of the inventive brake system with a system for automatic control of the braking operation, such as an anti-skid control system, will advantageously be enabled in that control switches of the anti-skid control system are connected between the switching device and the solenoid of the valve device. In this way, in the event of control, the anti-skid control system with priority will be able to effect control of the valve device and to change the actuating pressure independently of the position of command of the switching device. On the other hand, even with the anti-skid control system operating, the braking action may be terminated by releasing the brake pedal. Thus, external control of the inventive brake system by, e.g., an anti-skid control system is possible without any additional valve devices.

According to a further suggestion of the invention the valve device may consist of an electromagnetically operated 3/3-way valve. According to the invention it is also possible for the valve device to consist of two electromagnetically operable 2/2-way valves connected in parallel, one valve which is open, when currentless, and which connects the brake system with the reservoir and one valve which is closed, when currentless, and which connects the brake system with the pressure medium source. The latter design has the advantage of enabling the valve device to be completed in a simple manner by adding further 2/2-way valves, e.g., if several brake circuits are to be controlled which are independent of one another.

According to the invention it is possible to connect the working chamber of a brake booster for the actuation of the master cylinder at the pressure medium outlet of the valve device. Such a design is advantageous in that the generation of the auxiliary energy is independent of the force transmission in the hydraulic brake system. Thus, the vacuum in the suction port of a vehicle engine, an air compressor, or the hydraulic servo-steering system of the vehicle may be used for the generation of the auxiliary energy without thereby influencing the structure of the hydraulic brake system. Further, a brake booster enables in emergency operation of the brake upon failure of the auxiliary energy.

A preferred embodiment of the invention consists in that the actuating element has a reaction piston pressurized by the controlled actuating pressure in opposition to the direction of actuation, the movements of the reaction piston causing the switching device to close and open. With such an arrangement there will result a direct feed-back of the actuating pressure to the switching device, thus a very sensitive control of the actuating pressure being enabled. The size of the reaction piston may be selected freely. Thus, an optimal adaptation of the ratio between actuating force and braking effect will be possible in dependence on the respective application. A travel simulator may be arranged between the reaction piston and a force-transmitting member leading to the brake actuation device. This will be of particular advantage in the case of brake systems having no master brake cylinder and being directly actuated by auxiliary energy in order to generate an actuating travel at the actuation device, which actuating travel increases as the actuating force increases, and to simulate the usual force-to-travel ratio of hydraulic brake systems without auxiliary energy boosting. The reaction piston and the switching device will only carry out the required switching stroke, thus not needing a great constructional length.

Another advantageous embodiment of the invention will be achieved in that the switching device, the reaction piston, and the force-transmitting member are arranged in a booster piston of a brake booster for the actuation of a master brake cylinder, said booster piston being pressurizable by the actuating pressure. Such a brake booster is characterized by a simple structure and a short constructional length and it avoids the disadvantages implied by the known arrangement of the valve device in the booster piston.

An advantageous embodiment of the switching device of the inventive brake system will be achieved by arranging three contact rings coaxially next to each other. A first contact ring thereof will be fastened in the housing of the switching device, a second contact ring being fastened at the actuating element, while the third contact ring is supported axially displaceably in the housing and is pressed by a spring, contrary to the direction of actuation of the switching device, against an abutment formed fast with the housing and keeping the third contact ring in a mid-position at a distance between the first and second contact rings. This inventive design of the switching device may easily be accommodated in a bore of a housing, e.g., in a booster piston. The force-transmitting member which connects the reaction piston with the brake actuation device may be passed through the switching device, thus enabling an arrangement of the switching device between the reaction piston and the brake actuation device. Preferably, the first contact ring of the switching device is connected to a 2/2-way valve which is closed, when currentless, the second and third contact rings being connected to respectively a 2/2-way valve which is open, when currentless, and to the positive pole of a power source.

The invention also provides several possibilities of creating a dual circuit brake system. It may, e.g., be possible to construct a dual circuit brake system with direct auxiliary energy actuation of the brakes by providing each brake circuit with an independent pressure medium source, an electromagnetically operable valve device, a switching device, and a reaction piston. In this arrangement, the two reaction pistons of the two brake circuits will be operable by a common actuating member acting on a balance beam connecting the two reaction pistons with each other. In such an arrangement it will advantageously be possible to arrange a travel simulator between the actuating member and the balance beam. Further, the balancing movement of the balance beam may be limited by abutments in order to guarantee the actuation of one brake circuit without any large lost travel in case of failure of the other brake circuit.

If the inventive brake system has a brake booster for the actuation of a master brake cylinder, a dual circuit brake system may advantageously consist in that one brake circuit leading to the front wheel brakes is connected to the master brake cylinder and the other brake circuit leading to the rear wheel brakes is connected to the working chamber of the brake booster. The master brake cylinder may also be a tandem master cylinder the two chambers of which are each connected with a front wheel brake. According to a further suggestion of the invention, in such a dual circuit brake system, anti-skid control of the brake circuit leading to the rear wheel brakes may be achieved in a particularly simple manner if the valve device is controllable by an anti-skid control system and if the working chamber of the brake booster may be closed by a solenoid valve upon the onset of control.

For the generation of the auxiliary energy, preferably, an accumulator is provided which is loaded by an electric-motor-driven pump. However, as indicated above, other known arrangements may be used for the generation of the auxiliary energy.

BRIEF DESCRIPTION OF THE DRAWING

In the following, the invention will be explained in more detail, reference being made to examples of embodiments represented in the drawing, wherein

FIG. 3 is a dual circuit brake system with brake booster; and

FIG. 4 is a longitudinal section taken through a switching device for a brake system according to FIG. 3.

DETAILED DESCRIPTION

Figure 1:
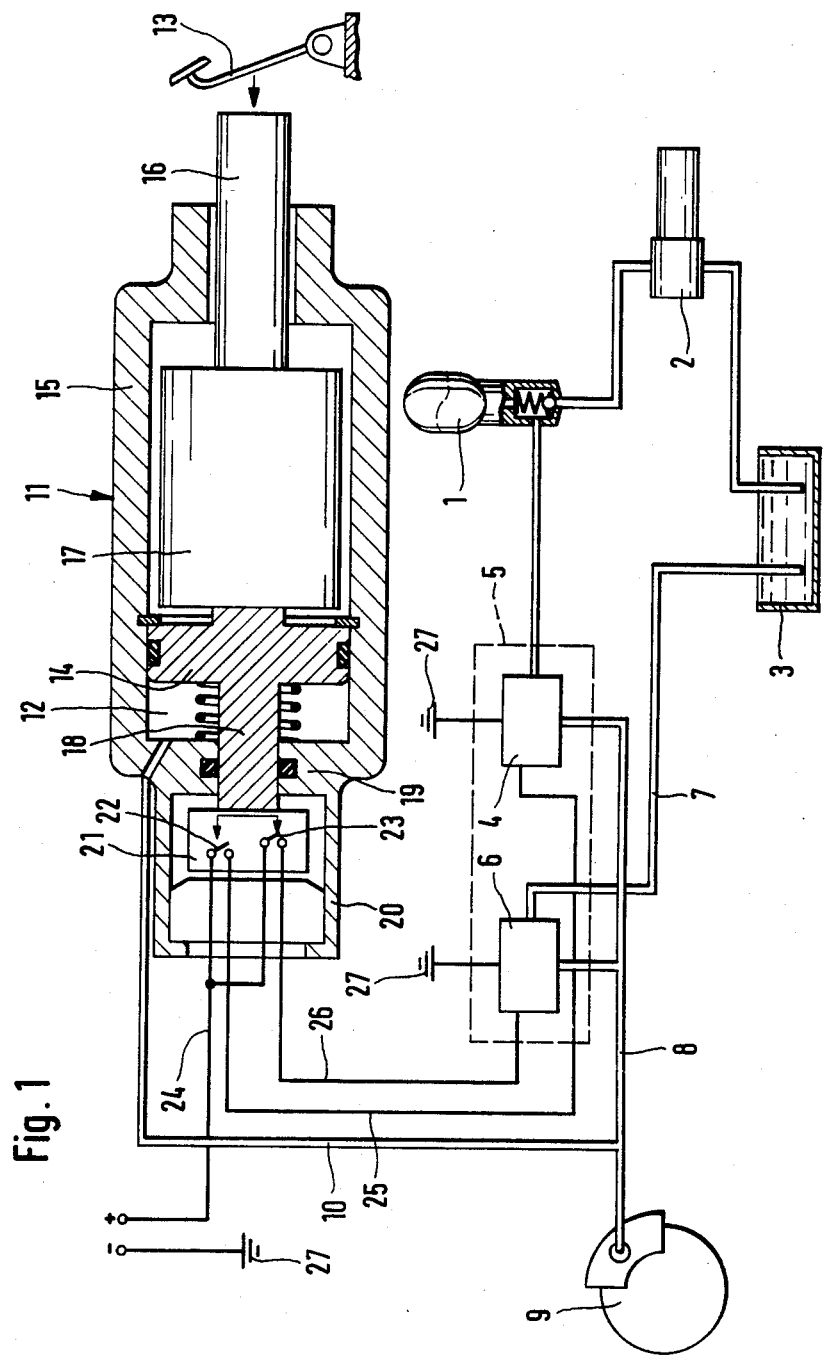
FIG. 1 is a hydraulic brake system directly actuated by auxiliary energy.

The brake system represented in FIG. 1 consists of an accumulator 1 loaded by an electric-motor-driven pump 2. Pump 2 delivers from an unpressurized reservoir 3. The accumulator 1 is connected to a solenoid valve 4 of a valve device 5. When currentless, the solenoid valve 4 is closed. A solenoid valve 6 of the valve device 5 is connected with the reservoir 3 via a return line 7. When currentless, said solenoid valve 6 is open.

The two solenoid valves 4, 6 are connected with the wheel brake cylinder of a vehicle brake 9 via a pressure line 8. A connection line 10 leads from the pressure line 8 to a control unit 11, ending there in a cylinder chamber 12 confined by a reaction piston 14 on its side facing the brake pedal 13. The brake pedal 13 is connected with the reaction piston 14 via an actuating rod 16 guided in the housing 15 of the control unit 11 and via a simulator spring 17. On its side averted from the simulator spring 17, the reaction piston 14 has a pin 18 penetrating the bottom 19 of the cylinder chamber 12 and serving for the actuation of an electric switching device 21 arranged in an extension 20 of the housing of the control unit 11.

Provided in the electric switching device 21 are two switches 22, 23 which are open in their basic positions and which, via a conductor 24, are connected with the positive pole of a power source. A conductor 25 leads from the switch 22 to the magnet coil of the solenoid valve 4 while a conductor 26 leads from the switch 23 to the magnet coil of the solenoid valve 6. In order to close the switch 22 a larger displacing stroke of the reaction piston 14 is required than is needed for closing the switch 23. The free poles of the power source and of the coils of the solenoid valves 4, 6 are connected with one another by ground connections 27.

The mode of operation of the brake system illustrated in FIG. 1 is as follows:

Upon starting of the vehicle, wherein the brake system is assembled, the drive of the pump 2 will be switched on and the accumulator 1 will be loaded. A pressure control device monitors the load of the accumulator, keeping the accumulator pressure on a preset level. The drawing shows the brake system in the released position of the brake. In this position, the switches 22, 23 are open and the coils of the solenoid valves 4, 6 are currentless. The solenoid valve 4 is closed. The solenoid valve 6 is open. The wheel brake 9 and the cylinder chamber 12 are communicating with the unpressurized reservoir 3 via the open solenoid valve 6.

Upon actuation of the brake pedal 13 the reaction piston 14 will be displaced leftwards by means of the actuating rod 16 and the simulator spring 17. In doing so, the displacing forces required are but small as the reaction piston 14 is not pressurized. The displacement of the reaction piston 14 will at first cause the switch 23 to close, thus the solenoid valve 6 being energized and closing. Thereby the vehicle brake 9 and the cylinder chamber 12 will be separated from the reservoir 3. As the operation goes on, the reaction piston 14 will be moved further into the pressure chamber 12. The pressure medium thus displaced will flow into the wheel brake cylinder of the vehicle brake 9 and will there effect a reduction of the brake clearances. Next, the switch 22 will close, thus the solenoid valve 4 being energized and opening. The pressure in the pressure line 8, the vehicle brake 9, the connection line 10, and in the cylinder chamber 12 will increase until the reaction force generated by the pressure at the reaction piston 14 will exceed the actuating force applied to the brake pedal 13, thus moving the reaction piston 14 back towards its initial position. Thereby the switch 22 will open again, thus the solenoid valve 4 returning into its closed position and interrupting the pressure medium supply from the accumulator 1. The pressure prevailing at the vehicle brake 9 and in the pressure chamber 12 now will remain constant until a change in the actuating force at the brake pedal 13 will effect a new displacement of the reaction piston 14. If the switch 22 closes again, there will be a further increase of the actuating pressure However, if the switch 23 is opened by a reduction of the actuating force at the brake pedal 13, then the solenoid valve 6 will open and cause the actuating pressure to drop down to the respective value predetermined by the actuating force at the brake pedal 13.

As is revealed by the description of the mode of operation, it is possible to very sensitively choose the actuating pressure for the actuation of the vehicle brake 9, particularly because the rating of the closing distances of the switches 22, 23 may be very small. As the solenoid valves are characterized by a high switching speed, the build-up of the actuating pressure, as a rule, will not be effected by one sole closing action of the switches 22, 23. Due to a multitude of intermittent switching operations, there will rather be a continuous adaptation of the actuating pressure to the actuating force generated at the brake pedal. Thanks to the arrangement of the simulator spring 17, however, these switching operations will not be felt at the brake pedal 13. Due to the simulator spring 17, further, at the brake pedal 13, an actuating travel will be generated which will grow as the actuating force increases. Thus, by means of the change in the position of his foot the driver will be in a better position to follow the operation of actuation.

Figure 2:
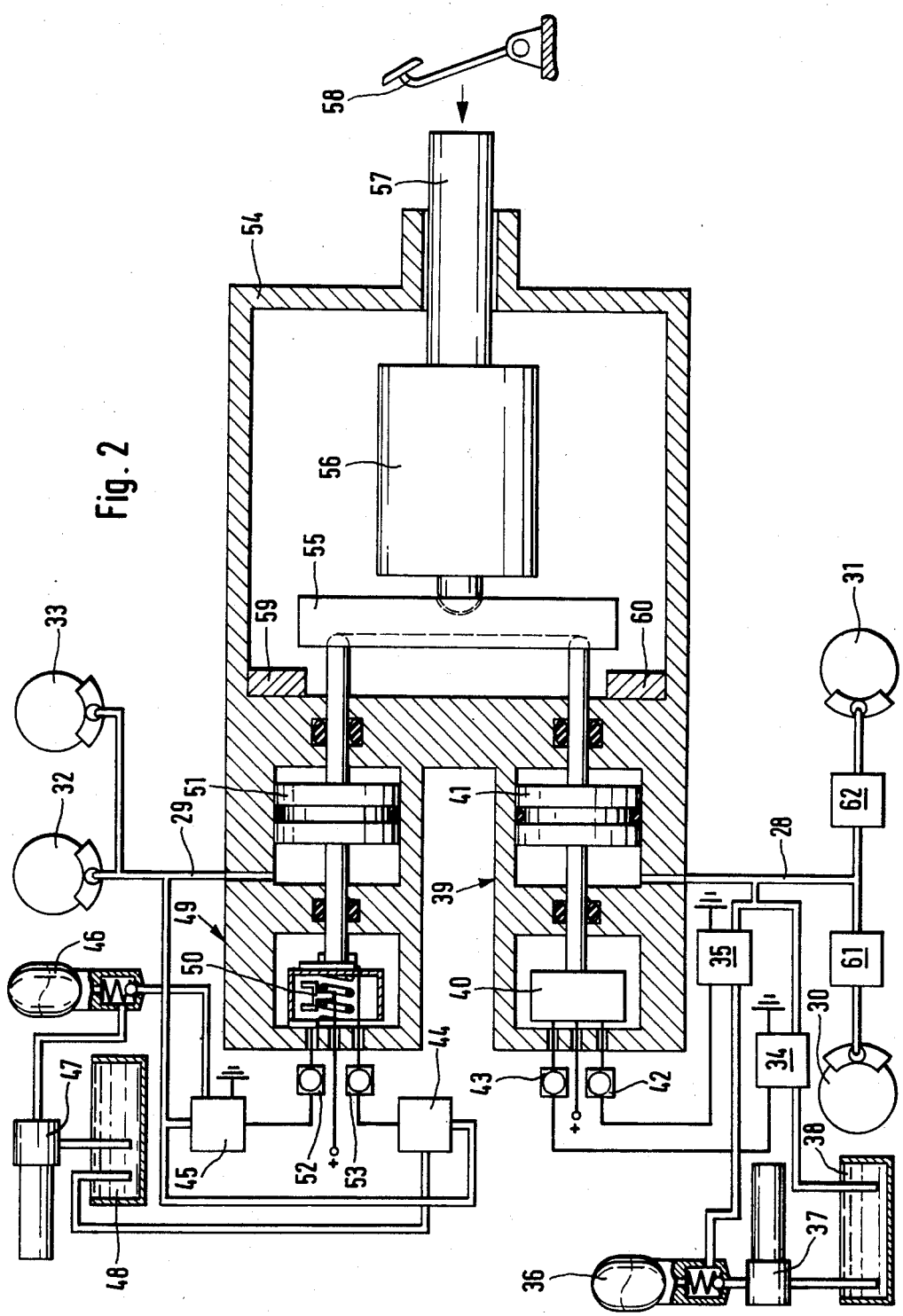
FIG. 2 is a dual circuit brake system directly actuated by auxiliary energy.

In the example of an embodiment represented in FIG. 2, two brake systems are arranged in parallel in respect of each other in order to provide two independent brake circuits 28, 29. In terms of fundamental structure, said brake systems correspond to that one represented in FIG. 1. The front wheel brakes 30, 31 of a vehicle are connected with the brake circuit 28, the rear wheel brakes 32; 33 of the vehicle being connected to the brake circuit 29. Via solenoid valves 34, 35, the brake circuit 28 has communication with an accumulator 36, an electric-motor-driven pump 37 loading the accumulator 36 with pressure medium from a reservoir 38. Provided for the control of the solenoid valves 34, 35 is a control device 39 with an electric switching device 40 and a reaction piston 41. Control switches 42, 43 of an anti-skid control system are arranged between the switching device 40 and the coils of the solenoid valves 34, 35.

Via solenoid valves 44, 45, the brake circuit 29 has communication with an accumulator 46 loaded by an electric-motor-driven pump 47 and with a reservoir 48. Control of the solenoid valves 44, 45 will be effected by a control device 49 with an electric switching device 50 and a reaction piston 51. The reference numerals 52 and 53 mark the control switches of the anti-skid control system.

The control devices 39, 49 are fastened at a common housing 54 wherein a balance beam 55 is arranged which connects the two reaction pistons 41, 51 with each other. In the centre of the balance beam a simulator spring 56 is supported which is connected with a brake pedal 58 via an actuating rod 57. The swinging movement of the balance beam 55 is limited by abutments 59, 60 within the housing 54.

Upon the actuation of the brake pedal 58, an actuating pressure will build up in each brake circuit 28, 29 in the same manner as described above, referring to FIG. 1, if both brake circuits 28, 29 of this brake system are operative. As both reaction pistons 41, 51 are supporting themselves at the balance beam 55, keeping the same distance in respect of the point of support of the simulator spring 56, the actuating pressures in the two brake circuits 28, 29 will adapt to each other to thus keep the balance beam balanced. If, e.g., the actuating pressure in the brake circuit 29 drops below the value of the actuating pressure in the brake circuit 28 the reaction force effective at the reaction piston 51 will no longer be sufficient to keep the balance beam 55 balanced. The reaction piston 51 will be moved contrary to the switching device 50, thereby the solenoid valve 45 being controlled to open and a pressure increase being effected in the brake circuit 29. Not until the actuating pressure in the brake circuit 29 will have reached the value of the actuating pressure in the brake circuit 28 will the reaction piston 51 be able to return the balance beam 55 into its balanced position, thereby, via the switching device 50, the solenoid valve 45 being caused to close again.

Upon failure of one brake circuit, e.g., of brake circuit 29, there will be no pressure build-up possible at the reaction piston 51 which pressure would keep the balance beam 55 balanced. The abutment 59 provides a corresponding support for the balance beam 55, thus a normal actuation of the brake circuit 28 being possible.

By means of the control switches 42, 43 and 52, 53, and anti-skid control system may control both brake circuits 28, 29 independently of each other. Moreover, in the brake circuit 28 the two front wheel brakes 30, 31 each may be separated from the brake circuit 28 by a solenoid valve 61, 62 which is open, when currentless, on a command of control of the anti-skid control system. Thus, the actuating pressures at the two front wheel brakes 30, 31 may be controlled independently of each other. The described example of an embodiment reveals that the control of the inventive brake system by an anti-skid control system requires but a small additional constructional effort. Essential functions of control may already be carried out by the aid of the existing solenoid valves 34, 35, 44, 45. The brake system represented in FIG. 3 has a hydraulic brake booster 63 whose booster piston 64 operates a tandem master cylinder 65 of conventional construction. A first brake circuit 67 leading to a front wheel brake of a vehicle is connected to a cylinder chamber 66 of the tandem master cylinder 65. A second brake circuit 69 leading to a further front wheel brake of a vehicle is connected to the other cylinder chamber 68. The brake booster consists of a cylindrical housing 71 with a longitudinal bore 70 wherein the booster piston 64 is displaceably guided and sealed. The booster piston 64 is connected with the piston 73 of the tandem master cylinder 65 via a tappet 72. The booster piston 64 divides the longitudinal bore 70 into a vacuum chamber 74 communicating with the storage reservoir 75 of the tandem master cylinder 65 and into a working chamber 76. Lines 77, 78 connect said working chamber 76 to a solenoid valve 79 which is closed, when currentless, and to a solenoid valve 80 which is open, when currentless. Besides, via a further line 81, the working chamber 76 communicates with a third brake circuit 82 leading to the rear wheel brakes of the vehicle.

On the side averted from the tandem master cylinder, the working piston 64 has a cylindrical extension 83 of smaller diameter which penetrates the front wall 84 of the booster housing 71 where it is sealed, said front wall 84 confining the working chamber 76. Within the extension 83, a bore 85 is provided wherein a reaction piston 86 is arranged which is connected with a brake pedal 88 via an actuating rod 87 protruding from the extension 83. Via a transverse bore 89, the bore 85 communicates with the working chamber 76. The bore 85 is followed by a bore 90 containing an electric switching device 91 of annular design. As far as the fundamental structure is concerned, the switching device 91 corresponds to the switching device 21 of the example of an embodiment represented in FIG. 1 and is connected with a power source and the coils of the solenoid valves 79, 80 in the same manner as there, i.e., via electric conductors 24, 25, 26. The supply as well as the removal of pressure medium to or from the solenoid valves 79, 80 also corresponds to that one of the example of an embodiment according to FIG. 1, thus in this respect reference being made to the preceding paragraph of the description. What is different from the embodiment according to FIG. 1 is only the arrangement of the control switches 92, 92a of an anti-skid control system in the conductors 25, 26, said control switches 92, 92a being closed in the basic position.

The construction of the annular switching device 91 is discernible from FIG. 4. It consists of a contact ring 93 fastened in the bore 90 of the extension 83 by means of two insulators 94, 95. The conductor 25 is connected to the contact ring 93. Within the insulator 95, a contact ring 96 is supported in an axially displaceable manner. A spring 97 presses the contact ring 96 against an abutment at the insulator 95. The conductor 24 is connected to the contact ring 96. On the actuating rod 87, a further contact ring 98 is displaceably arranged by means of an insulator 99. A spring 100 supported at the actuating rod 98 presses the contact ring 98 in the direction of the contact ring 96 against an abutment 101 at the actuating rod 87. The prestress of the spring 100 is clearly stronger than the prestress of spring 97.

A movement of the actuating rod 87 in the direction of the booster piston 64 at first will cause the contact ring 98 to abut at the contact ring 96. Subsequently, the two contact rings 98, 96 will be displaced jointly until contact ring 96 will come to rest at contact ring 93. Upon a further movement of the actuating rod 87 in the same direction, the abutment 101 will lift off from the insulator 99, thereby the spring 100 being compressed. The described switching device 91 thus forms two switching contacts closing one after the other in a travel-responsive manner.

The brake system represented in FIG. 3 has the following mode of operation:

Upon actuation of the brake pedal 88, there will be a displacement of the actuating rod 87 together with the reaction piston 86 in the direction of the working piston 64. After a small displacing travel, at first the solenoid valve 80 will be operated, communication to the reservoir 3 being interrupted. After a further small displacing travel the solenoid valve 79 will be operated and the accumulator 1 will be connected with line 77. Thus pressure medium acted upon by high pressure will enter the working chamber 76 and, via line 81, the brake circuit 82. The booster piston 64 will be displaced to the left and actuate the piston 73 of the tandem master cylinder 65, thus pressure likewise building up in the brake circuits 67, 69. From the working chamber 76 pressure medium will flow through the transverse bore 89 and enter bore 85, pressurizing the reaction piston 86. If the reaction force generated thereby at the reaction piston 86 surpasses the actuating force at the brake pedal 88, the reaction piston 86 will no longer be able to follow the actuating movement of the booster piston 64, i.e. the reaction piston 86 will be moved back with regard to the booster piston 64, thus the solenoid valve 79 lifting and the pressure medium supply from the accumulator 1 being interrupted. The operating condition achieved now will be maintained as long as the reaction force at the reaction piston 86 and the actuating force at the brake pedal 88 are balanced. As the brake circuit 82 is directly connected to the working chamber 76 the actuating pressure thereof will be to the actuating pressures of the brake circuits 67, 69 as the effective surface of the piston 73 will be to the effective surface of the booster piston 64 in the working chamber 76.

If there is a reduction in the actuating force at the brake pedal 88 the prevailing actuating pressure will move the reaction piston 86 into its rest position, thereby the solenoid valve 80 opening and the actuating pressure in the working chamber 76 and the brake circuit 82 decreasing. At the same time, the booster piston 64 and the piston 73, supported by resilient force, will return into their rest positions, the pressure in the brake circuits 67, 69 likewise decreasing.

If there is a failure of brake circuit 82 or of the auxiliary energy supply due to a defect it will be possible to directly mechanically actuate the brake circuits 67, 69 by means of the brake pedal 88, with the reaction piston 86 moving so far into the bore 85 until it will come to abut at the booster piston 64. Likewise, it will be possible to actuate the rear wheel brakes connected to brake circuit 82 if brake circuit 67 and/or brake circuit 69 have failed. In this event, the supplied pressure medium will displace the booster pistion 64 so far in the direction of the tandem master cylinder 65 until the pistons of the tandem master cylinder 65 will support themselves at the cylinder bottom. Then, it will be possible for a pressure for the actuation of the rear wheel brakes to build up in the working chamber 76 and in the connected brake circuit 82 depending on the pressure applied to the brake pedal.

The disclosed brake system permits the realization of anti-skid control of the brakes connected to the brake circuit 82 in a particularly simple manner. The described system will only have to completed by a solenoid valve which, upon the onset of anti-skid control, will interrupt the connection line between the working chamber 76 and the lines 77, 78, 81. Subsequently, via the control switches 92, 92a, it will be possible for the anti-skid control system to control the actuating pressure in the brake circuit 82 by means of the solenoid valves 79, 80. The outlet of working chamber 76 closed, the pressure in the brake circuits 67, 69 will be kept up or varied, respectively, by the actuation of the reaction piston 86, the reaction piston 86 being moved to a greater or lesser extent into the bore 85 and thus hydraulically moving the booster piston 64. As in this action the reaction piston 86 will plunger deeper into the bore 85 than is permitted by the contact travel of the switching device 91 the spring 100 will be compressed. A release of the brake during anti-skid control will be ensured by the fact that the coil of the additional solenoid valve locking the working chamber 76 will be connected to the conductor 26 of the switching device 91. Thus, the solenoid valve will open as soon as the switching device 91 will be brought into its brake-released position. The pressure in working chamber 76 may then decrease in the usual manner via the solenoid valve 80.

The efforts for additionally equipping the described brake system with a anti-skid control system are relatively small, and such a solution may be used as substitute for a load-responsive braking force control device.

What is claimed is:

1. An auxiliary-energy-operable hydraulic brake system for automotive vehicles, in which a valve device (5) connected to a pressure medium source and to an unpressurized reservoir and controlling an actuating pressure is operable by an actuating element (16, 17, 18); pressure means applying a reaction force proportional to the actuating pressure to said actuating element in any direction of actuation thereof wherein said valve device (5) is operable electromagnetically and controllable by an electric switching device (21) coupled to said actuating element (16, 17, 18);
control means for alternate opening and closing of ports of said valve device by said switching device in response to the brake actuating pressure.

2. An auxiliary-energy-operable hydraulic brake system for automotive vehicles, in which a valve device (5) connected to a pressure medium source and to an unpressurized reservoir and controlling an actuating pressure is operable by an actuating element (16, 17, 18) which irrespective of its direction of actuation may be pressurized by a reaction force proportional to the actuating pressure wherein said valve device (5) is operable electromagnetically and controllable by an electric switching device (21) coupled to said actuating element (16, 17, 18);
wherein said switching device (21) comprises two switches (22, 23) which are open in their basic positions and which may be closed by the moveable actuating element (16, 17, 18) one after the other, wherein the first switch (23) closes first thereby controlling a sealing of a reservoir port (7) of the valve device (5) and the second switch (22) controlling an opening of a pressure port (1) of the valve device (5).

3. A brake system as claimed in claim 2, wherein control switches (42, 43, 52, 53, 92, 92a) of an anti-skid control system are connected between the electric switching device (40, 50, 91) and the magnetic coils of the valve device (34, 35; 44, 45; 79, 80).

4. A brake system as claimed in claim 3, wherein the valve device consists of an electromagnetically operable 3/3-way valve.

5. A brake system as claimed in claim 3, wherein the valve device (5) consists of two electromagnetically operable 2/2-way valves (4,6) connected in parallel, one valve (6) which is open, when currentless, and which connects the brake system (8 through 10) with the reservoir (3) and one valve (4) which is closed, when currentless, and which connects the brake system with the pressure medium source (1).

6. A brake system as claimed in claim 5, wherein the working chamber (76) of a brake booster (63) for the actuation of a master cylinder (65) is connected at the pressure medium outlet (77,78) of the valve device (79,80).

7. A brake system as claimed in claim 6, wherein the actuating element has a reaction piston (14, 41, 51, 86) pressurized by the controlled actuating pressure irrespective of the direction of actuation and in that the closing and opening of the switching device (21, 40, 50, 91) is effected by the movement of the reaction piston.

8. A brake system as claimed in claim 7, wherein a travel simulator (17,56) is arranged between the reaction piston (18, 41, 51) and a force-transmitting member (16,57) leading to the brake actuation device (13,58).

9. A brake system as claimed in claim 7, wherein the switching device (91), the reaction piston (86), and the force-transmitting member (87) are arranged in a booster piston (64) of a brake booster (63), said booster piston (64) being pressurizable by the actuating pressure.

10. A brake system as claimed in claim 9, wherein the switching device (91) has three contact rings (93, 96, 98) arranged coaxially next to one another, in that a first contact ring (93) is fastened in the housing (83) of the switching device and a second contact ring (98) is fastened at the actuating element (87), and in that, contrary to the direction of actuation, the third contact ring (96) supported axially displaceably in the housing is pressed by a spring (97) against an abutment (101) formed fast with the housing and keeping the third contact ring in a mid-position between the two other contact rings and at a distance in respect thereof.

11. A brake system as claimed in claim 10, wherein the first contact ring (93) is connected to a solenoid valve for the control of the pressure medium port towards the pressure medium source (1), said solenoid valve being closed, when currentless; in that the second or third contact ring is connected to respectively a solenoid valve (80) serving for the control of the return port (7) towards the reservoir (3) and being closed, when currentless, or to the positive pole of a power source.

12. A brake system as claimed in claim 1 further including two brake circuits which are independent of each other, and wherein an independent pressure medium source (36,46), an electromagnetically operable valve device (34, 35; 44, 45), and electric switching device (40,50), and a reaction piston (41,51) are provided for each brake circuit (28,29), the two reaction pistons of the two brake circuits being actuatable by a common actuating member (57) acting on a balance beam (55) which connects the two reaction pistons.

13. A brake system as claimed in claim 12, wherein a travel simulator (56) is arranged between the actuating member (57) and the balance beam (55).

14. A brake system as claimed in claim 13, wherein abutments (59,60) limit the balancing movement of the balance beam (55).

15. A brake system as claimed in claim 9, further including two brake circuits which are independent of each other, and wherein one of the brake circuits (67,69) leading to the front wheel brakes of a vehicle is connected to the master cylinder, and wherein the other brake circuit (82) leading to the rear wheel brakes of the vehicle is connected to the working chamber (76) of the brake booster (63).

16. A brake system as claimed in claim 15, wherein the valve device (79,80) is controllable by an anti-skid control system, and in that the working chamber (76) of the brake booster (63) may be closed by a solenoid valve upon the onset of anti-skid control.

17. A brake system as claimed in claim 16, wherein an accumulator (1) serves as pressure medium source, which accumulator (1) is loaded by an electric-motor-driven pump (2).

* * * * *